United States Patent [19]
Kiten et al.

[11] Patent Number: 5,721,610
[45] Date of Patent: Feb. 24, 1998

[54] FILM IMAGE PICKUP DEVICE

[75] Inventors: Hiroshi Kiten, Minoo; Manabu Inoue, Kobe; Shigeru Nagata, Sakai; Hirokazu Yagura, Sakai; Katsuyuki Nanba, Sakai, all of Japan

[73] Assignee: Minolta Co., Ltd., Osaka, Japan

[21] Appl. No.: 563,928

[22] Filed: Nov. 29, 1995

[30]   Foreign Application Priority Data

Dec. 9, 1994  [JP]  Japan .................................. 6-331913

[51] Int. Cl.$^6$ ................................................ G03B 27/62
[52] U.S. Cl. ...................... 355/75; 396/411; 347/224
[58] Field of Search ........................ 355/18, 29, 32,
355/48, 75; 396/207, 208, 209, 411, 412–415,
418; 347/224; 358/400

[56]          References Cited

U.S. PATENT DOCUMENTS 2,336,278  12/1943  Mihalyi .
4,870,437   9/1989  Omaki et al. .
5,220,371   6/1993  Tanii et al. .

FOREIGN PATENT DOCUMENTS 4-115251   4/1992  Japan .

*Primary Examiner*—R. L. Moses
*Attorney, Agent, or Firm*—Burns, Doane, Swecker & Mathis, LLP

[57]          ABSTRACT

A film image pickup device uses a cartridge in which film is fed out of the cartridge by causing a spool around which the film is wound to rotate. The film image pickup device includes a drive roller and a driven roller that are located near the film outlet of the cartridge and that are used for the conveyance of the film. The drive roller and driven roller are constructed such that either roller can come into contact with or retract from the other roller. Either of the drive roller and the driven roller has a barrel-shaped cross-sectional configuration while the other has a bobbin-shaped cross-sectional configuration, to impart a curvature to the film as it is pulled out of the cartridge.

21 Claims, 6 Drawing Sheets

FILM IMAGE PICKUP DEVICE

BACKGROUND OF THE INVENTION

1. Field of the Invention

The present invention pertains to a film image pickup device into which is placed a cartridge that houses developed film and which senses the images on the film for subsequent display.

2. Description of the Related Art

Film image pickup devices of the type into which is placed a cartridge that houses a developed film strip, and which senses the film images, have been conventionally known. The structure of a cartridge used in a film image pickup device of this type is shown in FIG. 1. Film 3 is housed in cartridge 4. Film 3 is drawn out of and rewound through film outlet 4a of cartridge 4 by means of the rotation of spool 4b. FIG. 2 shows the interior of cartridge 4 in the situation where the film 3 is completely wound around spool 4b. Film 3 is wound between resilient flanges 5a and 5b which are supported by spool 4b in a semi-fixed fashion and which are configured such that their circumferences surround film 3. In this situation, flanges 5a and 5b are in their natural configuration, due to taper 3a and notch 3b at the first end of film 3, and d not receive any stress from film 3. However, when film 3 is drawn out as shown in FIG. 3, film 3 pushes flanges 5a and 5b outward such that distance A between the shoulders of flanges 5a and 5b becomes larger than its original state, placing a large stress on flanges 5a and 5b. Further, when film 3 is used, a leading edge of film 3 needs to be initially drawn out of cartridge 4 via the rotation of spool 4b and conveyed to a winding spool through an image pickup unit at which the film images of film 3 are sensed (this is called a "thrust operation"). During this thrust operation, load is applied by the flanges in the direction against the conveyance of film 3 (this is called "thrust load"). Due to this load, film 3 wound around spool 4b becomes loose within the cartridge, adding force to press against flanges 5.

When the above-described operation in which film 3 is drawn out of and rewound into cartridge 4 is repeated, the stress inflicted onto flanges 5 becomes excessively large and results in the destruction of flanges 5. In a film image pickup device of the particular type in which a cartridge containing developed film is used, the film is repeatedly forwarded and rewound every time the film images are viewed, unlike in a camera, as a result of which the impact of the stress on flanges 5a and 5b inside cartridge 4, as described above, becomes quite substantial.

The present invention seeks to resolve these problems. Its object is to provide a film image pickup device into which is placed a cartridge that houses developed film and in which the stress inflicted onto the flanges inside the cartridge is reduced when the film is repeatedly fed out of and rewound into the cartridge, such that the durability of the cartridge may be improved.

SUMMARY OF THE INVENTION

In order to achieve this objective, the invention provides a film image pickup device into which is placed a cartridge that houses developed film, where the film is fed out of the cartridge by causing the spool around which the film is wound to rotate, and where the images of the film thus fed out are sensed. In a first aspect of this invention, the film image pickup device comprises a drive roller and a driven roller that are located near the film outlet of the cartridge and that are used for the conveyance of the film, wherein the drive roller and driven roller are constructed such that either roller can come into contact with or retract from the other roller.

In a second aspect of the invention, either of the drive roller and the driven roller has a barrel-shaped cross-sectional configuration while the other has a bobbin-shaped cross-sectional configuration.

Using the film image pickup device of this construction, since either of the drive roller or driven roller located near the film outlet of a cartridge in the device can come into contact with or retract from the other, when the first end or leading edge of the film, which is fed out via the rotation of the spool, has passed the gap between the rollers, both rollers are made to come into contact with each other so that the film may be pulled using the rotational force of the drive roller. As a result, the stress on the flanges caused by the loosening of the winding of the film inside the cartridge caused by thrust load may be eliminated.

In addition, by sandwiching the film fed out of the cartridge in between the drive roller and driven roller, either one of which has a barrel configuration while the other has a bebbin configuration, so that the film is made to warp and the width of the film is made to appear narrower, the effective width of the film can be made closer to the distance between the shoulders of the flanges. This reduces the amount of run-off of the flanges when the film is fed out so that the stress inflicted by the film onto the flanges may be reduced.

DESCRIPTION OF THE PREFERRED EMBODIMENT

Figure 1:
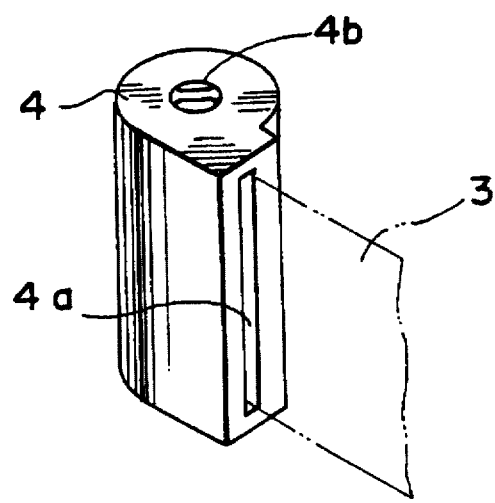
FIG. 1 shows the appearance of a cartridge housing the film used in the film image pickup device of the present invention.
Figure 2:
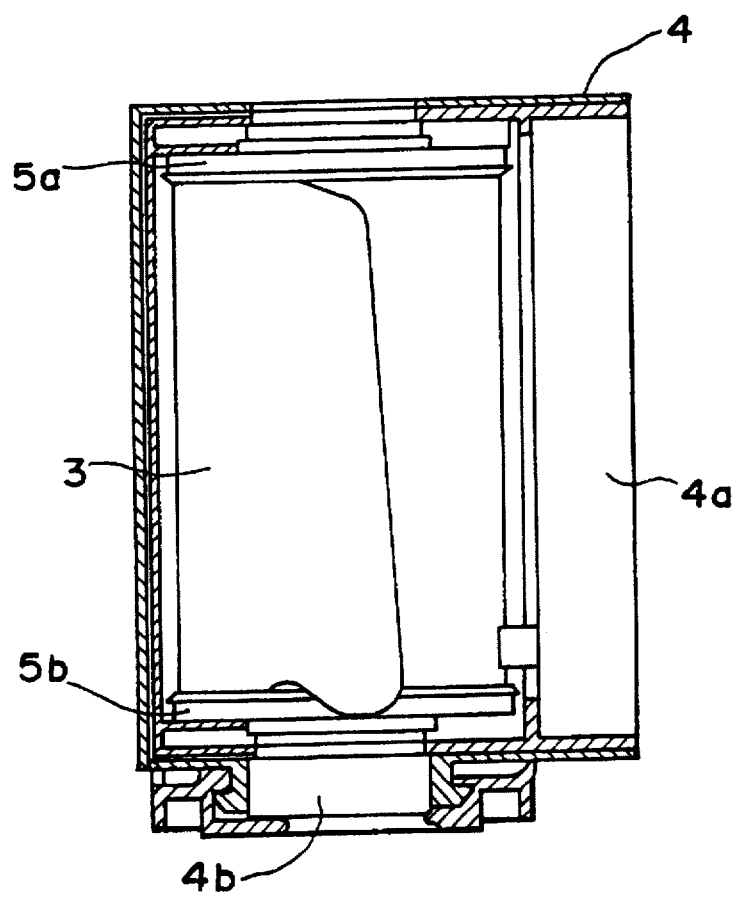
FIG. 2 is a cross-section showing the interior of the cartridge where the film is completely wound around the spool.
Figure 3:
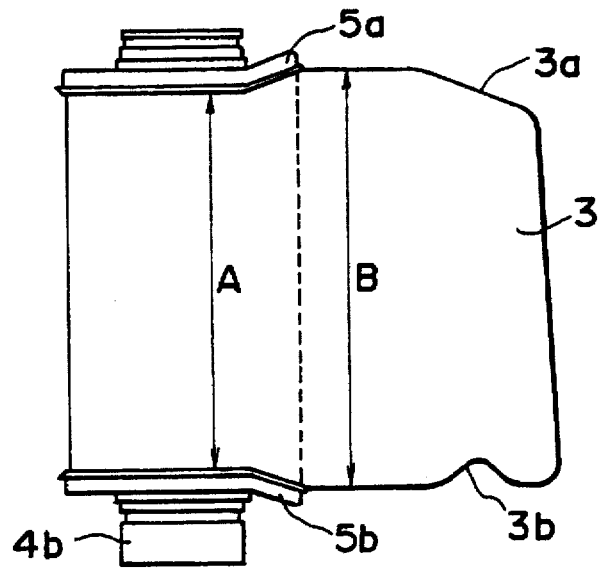
FIG. 3 shows the flanges receiving stress due to the film being pulled out.
Figure 4:
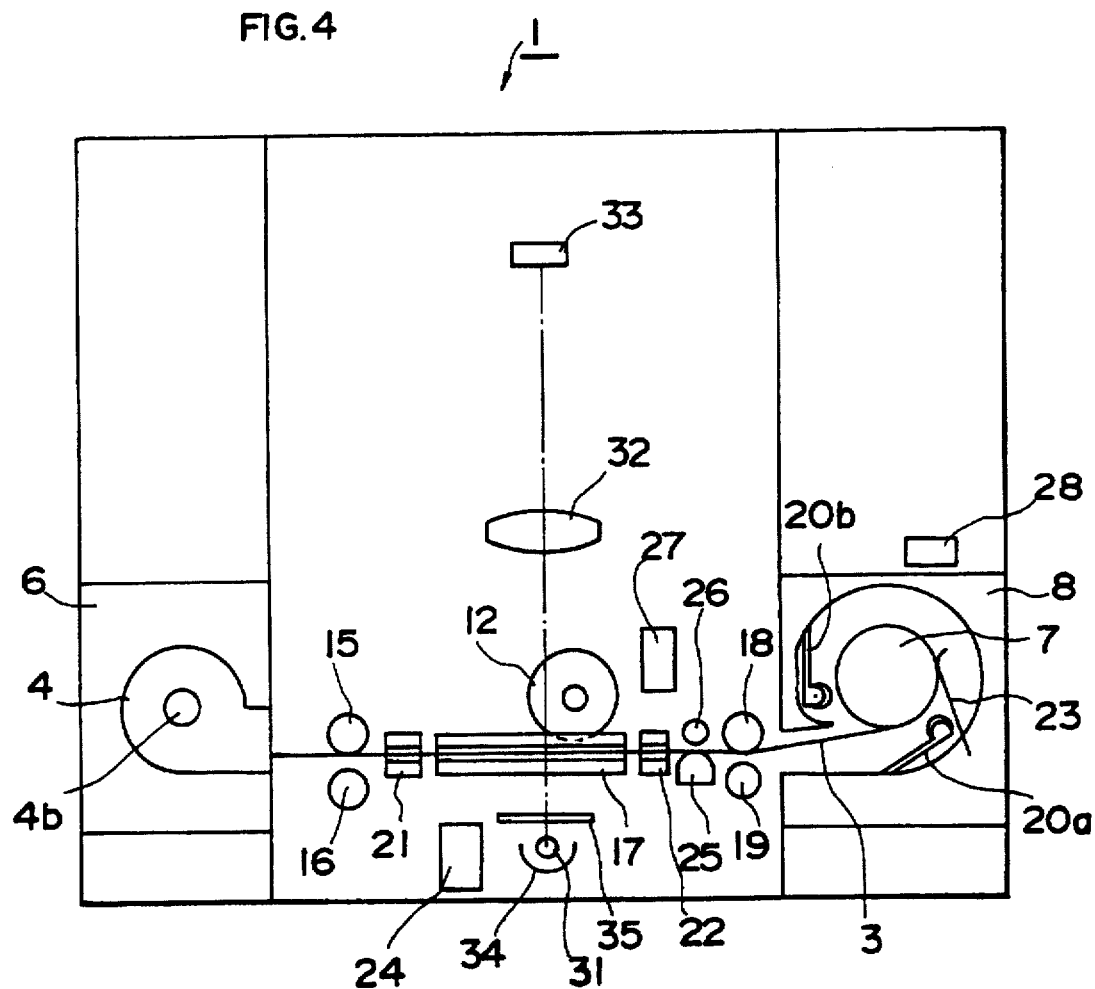
FIG. 4 illustrates the approximate construction of the film image pickup device of one embodiment of the present invention.
Figure 5:
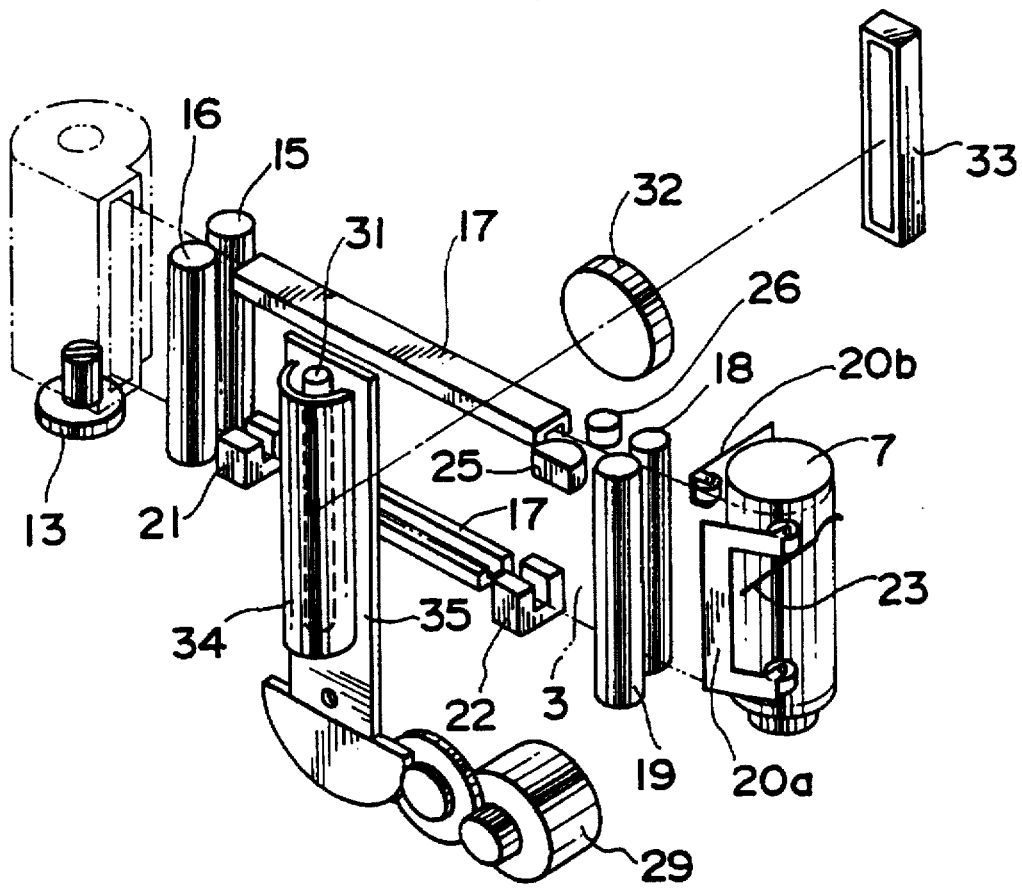
FIG. 5 is a perspective view showing the interior construction of the film image pickup device.

The film image pickup device of one embodiment of the present invention is explained below with reference to the drawings. The cartridge that houses a developed film strip, and which is used in the film image pickup device, is shown in FIGS. 1 through 3 described above. FIG. 4 shows an approximate construction of the film image pickup device, and FIG. 5 is a perspective view of the interior construction of the film image pickup device. Film image pickup device 1 (hereinafter "the device") has a cartridge bay 6, in which is placed cartridge 4 that houses a developed strip of film (hereinafter "film") 3. The rear end of film 3 is affixed on spool 4b. Winding spool 7 is located in winding spool bay 8, and winds film 3 fed out of cartridge 4. Device 1 has a film feeding system to feed film 3 forward and an optical system to sense the images recorded on film 3.

With reference to FIGS. 4 and 5, the main components of the film feeding system will first be explained. Feeding motor 12 is a drive source to convey film 3. Driver 13 is a means to transmit rotational force to spool 4b of cartridge 4 placed in cartridge bay 6, and is rotatably supported inside cartridge bay 6. Winding spool 7, around which film 3 fed out of cartridge 4 is wound, is rotatably supported inside winding spool bay 8. Film drive rollers 15 and 18 are located in the film conveyance path from cartridge bay 6 to winding spool bay 8, and convey film 3 via rotation. Driven rollers 16 and 19 press film 3 onto drive rollers 15 and 18 such that the rotation of drive rollers 15 and 18 is transmitted to film 3 without slipping. These driven rollers 16 and 19 are pressed against drive rollers 15 and 18 via the power of driven roller drive actuator 24 (see FIG. 7 for details). Film guides 17 guide film 3 as it is being conveyed, while regulating the movement of the film in the direction of its width as well as in the direction of the optical axis. Magnetic head 25 reads magnetic information from film 3 or writes such information onto film 3. Head pad 26 presses film 3 onto head 25 via the power of head pad drive actuator 27 such that the contact between magnetic head 25 and film 3 may be kept stable.

Film pressing rollers 20a and 20b press film 3 against winding spool 7 so that film 3 fed into winding spool bay 8 may be tightly wound around winding spool 7. Film pressing roller drive actuator 28 (see FIG. 8 for details) is a drive source to press film pressing rollers 20a and 20b onto winding spool 7 and to allow them to disengage from the spool. Photo-interrupter 21 is a sensor to read the number of perforations on film 3. Photo-interrupter 22 is a sensor to determine the timing of reading and/or writing of magnetic data by magnetic head 25. Winding switch 23 is a switch to detect the movement of film 3 past film pressing roller 20a.

The components of the optical system will now be explained with reference to FIGS. 4 and 5. Light source 31 is a light source to project the image recorded on film 3 onto image pickup unit 33. Lens 32 causes an image recorded on film 3 to form an image on image pickup unit 33. Image pickup unit 33 comprises an image sensing element such as a CCD which converts the image formed by lens 32 into electronic signals. Reflection mirror 34 collimates the light emitted from light source 31. Shutter 35 shields the film from irradiation by the light emitted from light source 31, and is driven by shutter drive actuator 29.

Figure 6:
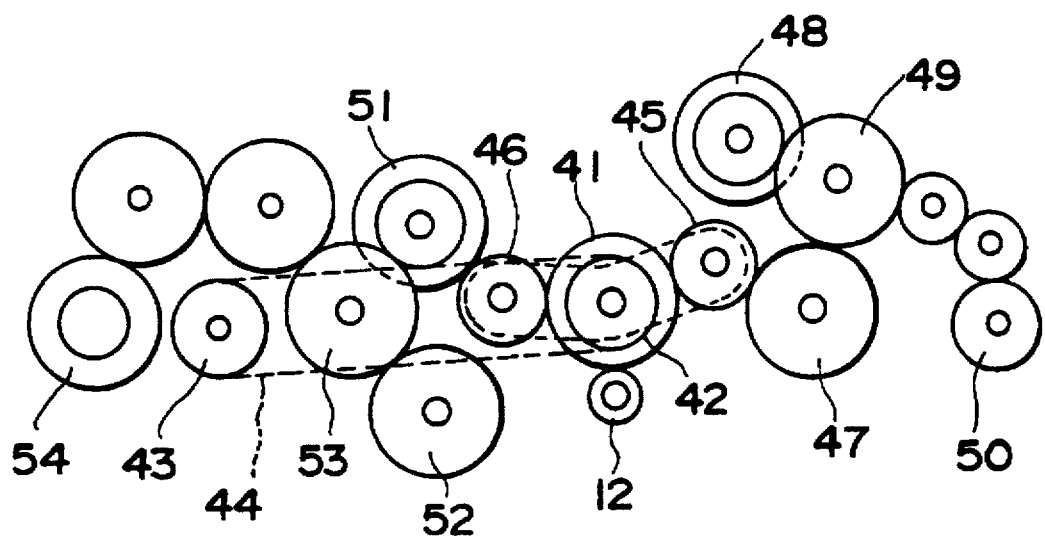
FIG. 6 shows the gears of the drive system of the film feeding unit used in the film image pickup device, as seen from the bottom.

The components described above will now be explained in detail. FIG. 6 shows a bottom view of the drive gears for the film feeding unit. Gear 54 is connected to driver 13, which accesses spool 4b of cartridge 4, via a sliding clutch mechanism (not shown in the drawing) and gear 50 is connected to winding spool 7 via a sliding clutch mechanism (not shown in the drawing) in the same manner as gear 54. Gear 54 causes driver 13 to rotate via multiple gears (described below) when feeding motor 12 rotates clockwise, such that film 3 inside cartridge 4 is pushed out, while it causes film 3 to be rewound into cartridge 4 when feeding motor 12 rotates counterclockwise. Gear 50 causes winding spool 7 to rotate when feeding motor 12 rotates clockwise, such that film 3 fed into winding spool bay 8 is wound around winding spool 7 while it causes winding spool 7 to rotate in the direction in which film 3 wound around the spool is unwound when feeding motor 12 rotates counterclockwise.

Feeding motor 12 is engaged with sun gear 41 integral with drive roller 18. A gear switching mechanism comprising sun gear 41 and its planetary gears 45 and 46 performs switching of speed using two types of gears 47 and 48 and gears 51 and 52, which have different gear ratios and are engaged with the planetary gears such that among spool 4b of cartridge 4, drive rollers 15 and 18 and winding spool 7, the spool winding film 3 is the fastest at all times in terms of film feeding speed. Specifically, when film 3 is fed from cartridge 4 to winding spool 7, the gears are switched such that the relationship spool 4b<drive rollers 15 and 18<winding spool 7 is realized in terms of film feeding speed, and conversely, when film 3 is rewound from winding spool 7 back into cartridge 4, the gears are switched so that the reverse relationship holds true. The differences in speed among the spools and rollers are absorbed by the sliding clutch mechanisms as to driver 13 and winding spool 7, and provide tension to film 3. Drive pulley 42 is located coaxially with sun gear 41, which is used to transmit the rotation of sun gear 41 to drive rollers 15 and 18. Belt 44 is connected to drive pulley 42 and driven pulley 43 so that the rotation of drive pulley 42 is transmitted to driven pulley 43. Drive roller 15 is located coaxially with driven pulley 43 and rotates together with drive roller 18.

Figure 7:
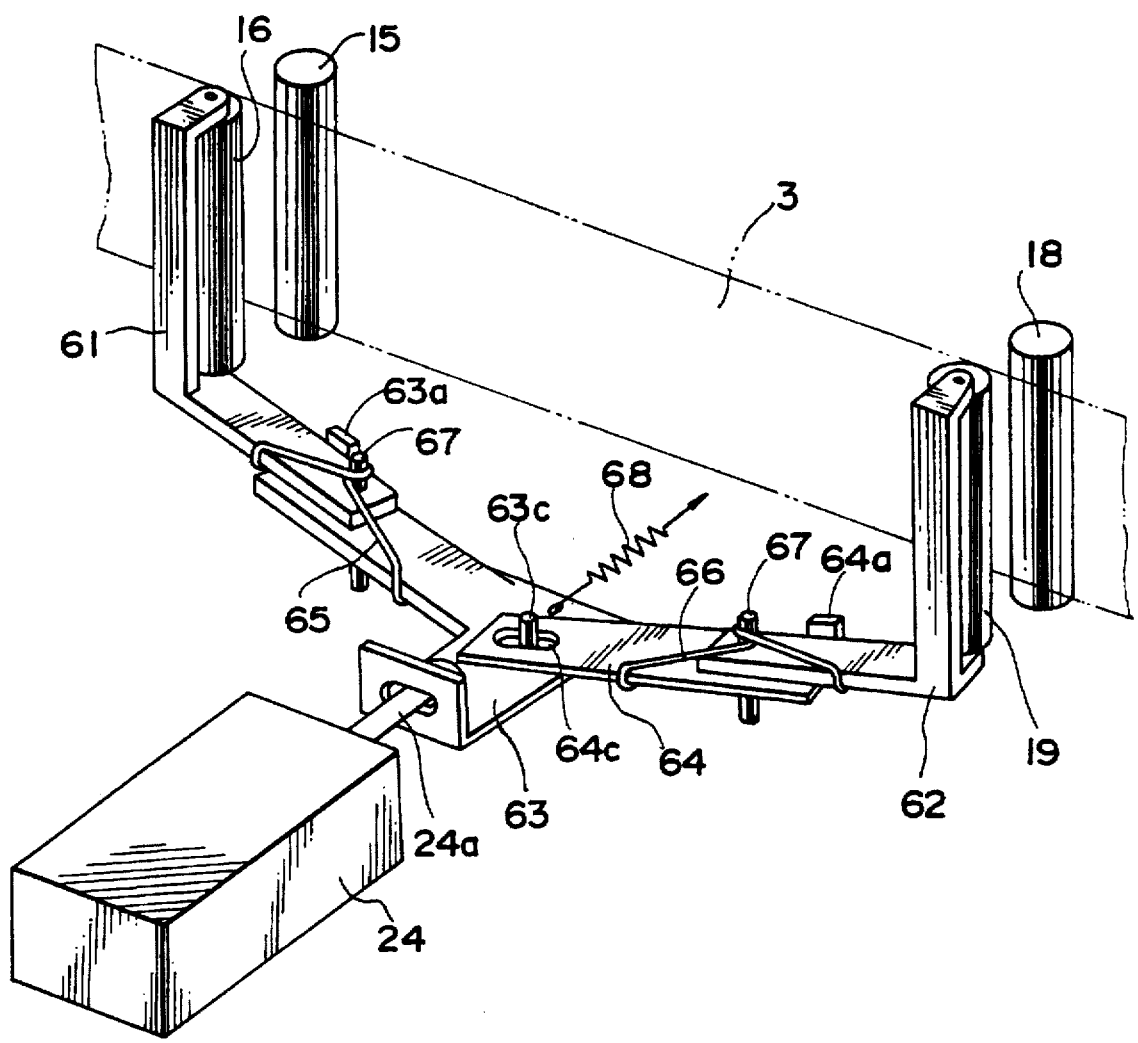
FIG. 7 is a perspective view showing the mechanism to cause the driven rollers of the film image pickup device to come into contact with or retract from the drive rollers.

FIG. 7 is a perspective view showing the mechanism that causes driven rollers 16 and 19 come into contact with or retract from drive rollers 15 and 18. Driven rollers 16 and 19 are rotatably held by roller holders 61 and 62. Roller holders 61 and 62 can rotate around pins 67 affixed to the main unit. Moreover, they are placed on roller drive plates 63 and 64 and are given force by driven roller pressing springs 65 and 66 such that they are pressed against protrusions 63a and 64a of roller drive plate 63 and 64, respectively. Roller drive plates. 63 and 64 can rotate around pins 67. Roller drive plate 64 is connected to roller drive plate 63 by means of pin 63c located on roller drive plate 63 and elongated hole 64c formed on roller drive plate 64. Roller drive plate 63 is given force by driven spring 68 on one end in the direction to retract driven rollers 16 and 19 and is connected to driven roller drive actuator 24 on the other end. Driven rollers 16 and 19 may be brought into contact with drive rollers 15 and 18 by the tractive force of driven roller drive actuator 24. Incidentally, this mechanism used for driven rollers 16 and 19 may be located on the side of drive rollers 15 and 18 so that drive rollers 15 and 18 come into contact with or retract from driven rollers 16 and 19.

Figure 8:
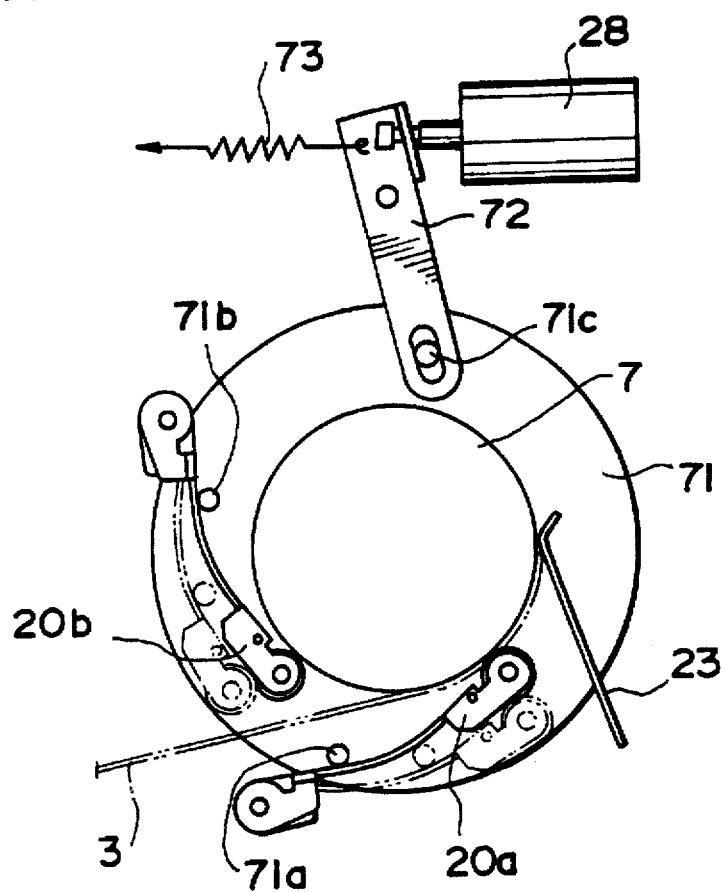
FIG. 8 shows the mechanisms to cause the film-pressing rollers of the film image pickup device to come into contact with the winding spool.

FIG. 8 shows a mechanism to cause film pressing rollers 20a and 20b to come into contact with or retract from winding spool 7. Film pressing roller drive actuator 28 is a drive source to retract film pressing rollers 20a and 20b from winding spool 7, and operates based on its tractive force. Film roller lever 72 converts the action of film pressing roller drive actuator 28 into the rotation of film pressing rotational plate 71 and is given force by tractive force of film pressing spring 73. Therefore, film pressing rotational plate 71 is normally forced in the direction to bring film pressing rollers 20a and 20b into contact with winding spool 7. Film pressing rotational plate 71 is rotatably located coaxially with winding spool 7. It is caused to rotate via the action of film roller lever 72 based on the tractive force of film pressing roller drive actuator 28, and pins 71a and 71b located on film pressing rotational plate 71 are moved to the positions indicated by the dotted lines from the positions indicated by the solid lines in the drawing, causing film pressing rollers 20a and 20b in contact with winding spool 7 to retract (retracted film pressing rollers 20a and 20b are shown by two-dot chain lines in the drawing). Winding switch 23 comprises a switching circuit together with winding spool 7 made of a dielectric material. This switching circuit is designed such that it can function under extremely light force: When film 3 passes film pressing roller 20a and pushes away winding switch 23 from winding spool 7, or when film 3 enters between winding switch 23 and winding spool 7, the electric circuit is disconnected and the switch functions. When this switch detects film 3, power to film pressing roller drive actuator 28 is cut off. Film 3 is then pressed against winding spool 7 by film pressing roller 20a is wound around the spool.

The operation in which film 3 housed in cartridge 4 is sensed for images using device 1, comprised as described above, will now be explained with reference to FIGS. 2 through 8. When cartridge 4 is placed in cartridge bay 6, a film feeding start switch (not shown in the drawings) turns ON and feeding motor 12 rotates clockwise (see FIG. 6), gears on the side of winding spool 7 engage with small reduction ratio gears and gears on the side of spool 4b engage with large reduction ratio gears via the action of planetry gears 45 and 46, whereby driver 13, drive rollers 15 and 18 and winding spool 7 rotate counterclockwise. At this time, the relationship in terms of film feeding speed via the rotation of the rollers and spools is set such that spool 4b<drive rollers 15 and 18<winding spool 7.

When the film is rewound, the reverse relationship holds true.

When the rollers and spools rotate as described above and spool 4b around which film 3 is wound inside cartridge 4 rotates in the direction to feed out film 3 via the rotation of driver 13, film 3 comes out of film outlet 4a of cartridge 4 and passes photo-interrupter 21. Photo-interrupter 21 then detects the passage of film 3 between drive roller 15 and driven roller 16, whereby driven roller drive actuator 24 is operated and driven roller 16 is brought into contact with drive roller 15. As a result, film 3 becomes sandwiched between rollers 15 and 16. When this happens, because the film feeding speed of rollers 15 and 16 is faster than the film feeding speed provided by the rotation of spool 4b as described above, the feeding of film 3 changes from feeding by the pushing action of spool 4b to feeding by the pulling action of drive roller 15 near film outlet 4a of cartridge 4, whereby film 3 is pulled out of cartridge 4. Because of this, the thrust load observed during the thrust operation no longer occurs, and film 3 no longer is loose inside cartridge 4. Consequently, film 3 no longer causes stress by pushing against flanges 5.

The conveyance of film 3 by means of drive roller 15 continues past film guides 17, photo-interrupter 22 and magnetic head 25 until film 3 reaches drive roller 18. When film 3 reaches drive roller 18, drive roller 18 also pulls film 3. Having reached winding spool bay 8, film 3 is pressed against winding spool 7 via the action of film pressing rollers 20a and 20b, and is wound around winding spool 7. For the method to remove film 3 from cartridge 4, see, e.g., U.S. Pat. No. 5,220,371. While film 3 is being conveyed in the manner described above, the number of perforations on film 3 is read by photo-interrupter 21 and the perforations are counted up to a prescribed number. When a prescribed portion of the image area recorded on film 3 is reached, the rotation of feeding motor 12 is stopped. When the rotation of feeding motor 12 is stopped, the reading of the image recorded on film 3 is performed by the optical system described above.

Figure 9:
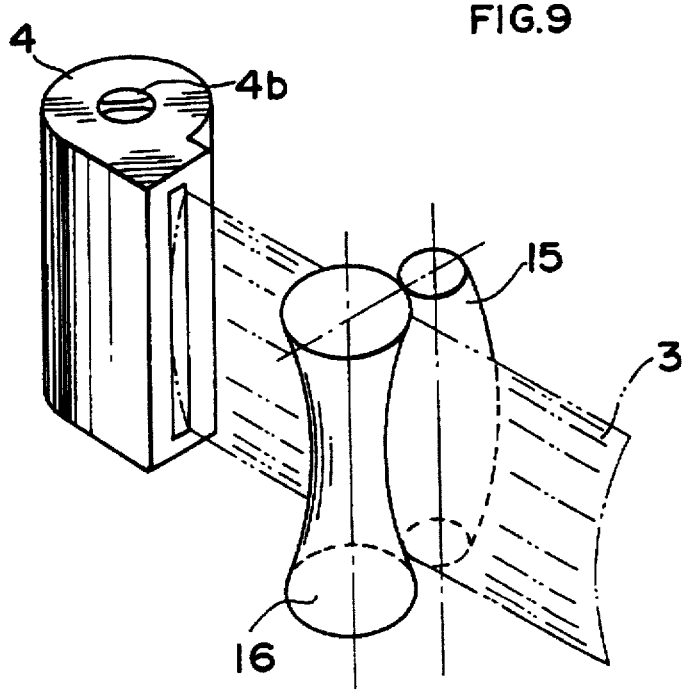
FIG. 9 is a perspective view showing alternative configurations of the drive roller and driven roller of the film image pickup device.

FIG. 9 shows alternative configurations of drive roller 15 and driven roller 16. By having drive roller 15 configured like a barrel which increases in diameter toward the center and having driven roller 16 configured like a bobbin which decreases in diameter toward the center, film 3 is made to warp so that the width B of film 3 shown in FIG. 3 is apparently reduced and made closer to distance A between the shoulders of flanges 5, thereby reducing the amount of run-off of flanges 5 due to film 3 being pulled. The degree of the warping of film 3 is set according to the size of film outlet 4a of cartridge 4 such that the center area of film 3 does not become scratched from rubbing against film outlet 4a of cartridge 4. This reduces the stress inflicted by film 3 onto flanges 5 in the condition where film 3 is being pulled out of cartridge 4. In addition, since any alternative configurations are acceptable for drive roller 15 and driven roller 16 as long as the amount of run-off of flanges 5 due to film 3 being pulled is reduced, drive roller 15 may be configured like a bobbin while driven roller 16 is configured like a barrel.

Figure 10:
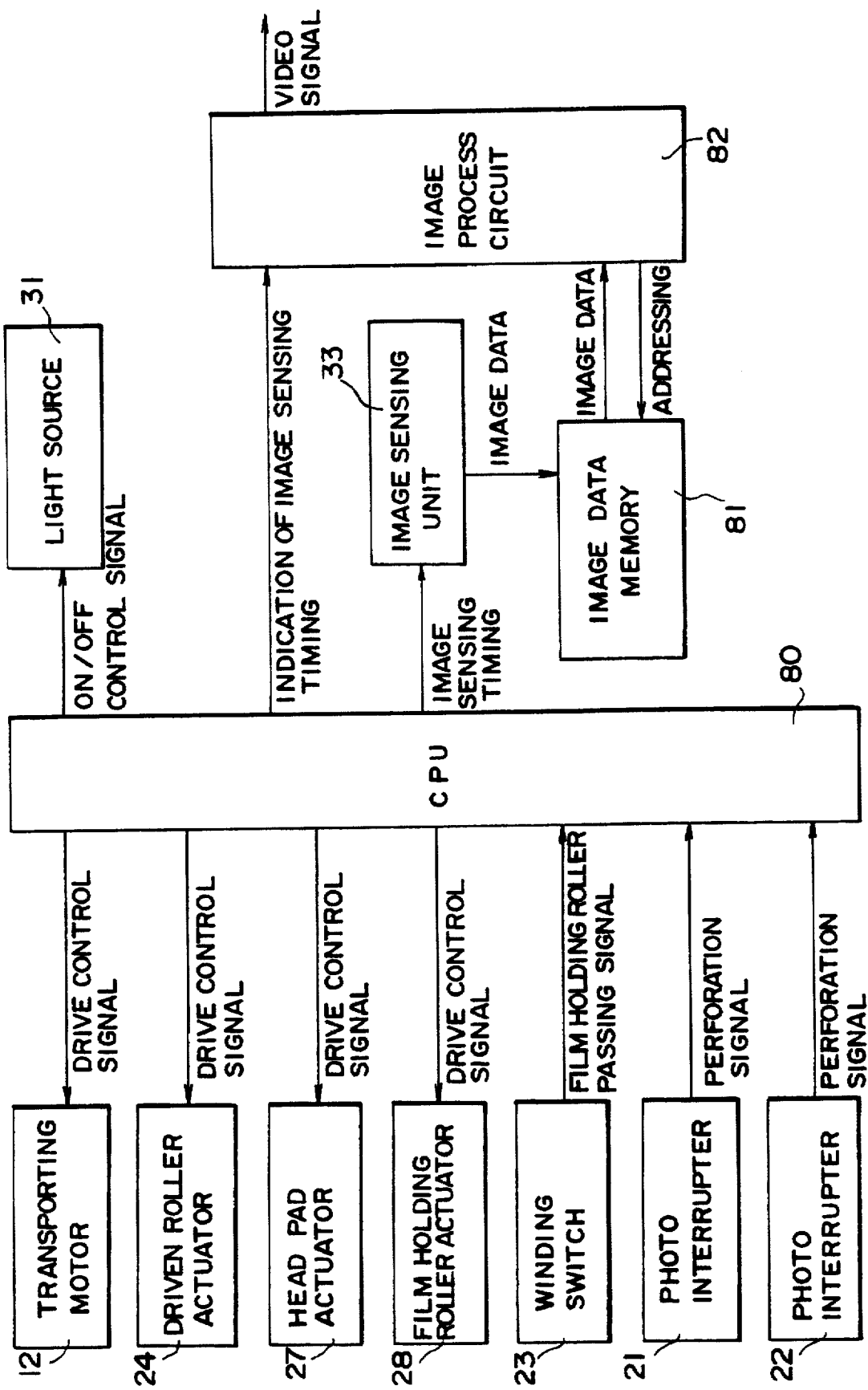
FIG. 10 is a block diagram of the control system of the film image pickup device.

The control system of this device will now be explained. FIG. 10 is a block diagram of the control system of this device. The control system has CPU 80 which is charged with the control of the entire system of the device. CPU 80 is connected to various components described below. Feeding motor 12 is a drive source for the conveyance of the film and is driven via drive control signals from CPU 80. Photo-interrupters 21 and 22 read the number of perforations on film 3 and output film perforation signals to CPU 80. Winding switch 23 outputs a film passage detection signal to CPU 80 when it detects the movement of film 3 past film pressing rollers 20a and 20b. Based on the signals from photo-interrupter 21 and 22 and winding switch 23, CPU 80 outputs drive control signals to feeding motor 12, driven roller drive actuator 24, head pad drive actuator 27 and film pressing roller drive actuator 28. Light source 31 is turned ON and OFF based on control signals from CPU 80. Image pickup unit 33 performs image sensing in response to an image pickup timing signal from CPU 80. Image data sensed by image pickup unit 33 is accumulated in image pickup data memory 81. Image processing circuit 82 reads the accumulated image data in response to an image pickup timing instruction signal from CPU 80 and processes the image data, after which it outputs the data as video signals to an external display monitor (not shown in the drawing).

Using the film image pickup device of the embodiment described above, film 3 fed out of cartridge 4 via the rotation of spool 4b is pulled by drive roller 15 near film outlet 4a of cartridge 4, which rotates faster than spool 4b, and is wound by winding spool 7 which rotates even faster than drive roller 15, as a result of which the loosening of film 3 wound inside cartridge 4 due to thrust load, and consequently the stress inflicted on flanges 5, may be eliminated. In addition, by having driven roller 16 retracted from drive roller 15 until the first end of the film reaches the gap between drive roller 15 and driven roller 16, film 3 may be smoothly become sandwiched and the load due to the rollers during thrust may be reduced. Drive roller 15 and driven roller 16 may be constructed in any fashion so long as either one of them may be brought into contact with or retracted from the other. The present invention is not limited to the construction of the embodiment provided above and appropriate changes may be made so long as they do not deviate from the essence of the invention.

Using the film image pickup device of the present invention as described above, the device is constructed such that a cartridge that houses developed film is placed in the device and the film is fed out of the cartridge by rotating the spool, wherein a drive roller and a driven roller which may be brought into contact with or retracted from each other are located near the outlet of the cartridge. Consequently, the film may be smoothly sandwiched between the drive roller and driven roller by moving either the drive roller or driven roller from a retracted position to a position where it comes into contact with the other when the film has been conveyed by the spool to the position of the drive and driven rollers, and furthermore, the film may be pulled out by transmitting the rotational force of the drive roller to the film. As a result, the thrust load that occurs during the thrust operation in which the first end of the film is drawn out of the cartridge may be reduced and the stress inflicted due to the thrust load on the flanges located on the spool around which the film is wound may be eliminated. In other words, in a film image pickup device of this type, image sensing is repeatedly performed. To do so, the film is moved randomly after a cartridge is placed in the device, unlike a camera in which the film is normally pulled out and rewound once per photo-taking session, in order to view various film images. Consequently, the durability of the cartridge has been problematic. However, using the present invention, the stress on the flanges due to the repeated pulling of the film out of the cartridge and its rewinding back into the cartridge may be reduced via a simple construction, improving the durability of the cartridge.

As a further feature of the invention, either the drive roller or driven roller has a barrel-shaped configuration while the other has a bobbin-shaped configuration, as a result of which the film fed out of the cartridge is made to warp such that the film width becomes smaller and closer to the gap between the shoulders of the flanges. This reduces the amount of run-off of the flanges due to the film being pulled out, and thus the stress inflicted on the flanges may be reduced even when the film is repeatedly fed out of and into the cartridge, thereby improving the durability of the flanges.

What is claimed is:

1. A film conveying device which conveys a developed film accommodated in a cartridge, comprising:
   a feeder for drawing a leading edge of the developed film out of the cartridge and feeding the developed film;
   a driving roller, which is capable of coming into contact with or being retracted from the film fed out by said feeder, for conveying the film fed out by said feeder; and
   a controller for controlling said driving roller so as to selectively contact the fed film or be retracted from the fed film.

2. The film conveying device according to claim 1, wherein said driving roller is located near an outlet of the cartridge.

3. The film conveying device according to claim 2, further comprising a driven roller, which is located near the outlet of the cartridge, for conveying the film together with said driving roller.

4. The film conveying device according to claim 3, wherein one of said driving roller and driven roller has barrel-shaped configuration while the other has bobbin-shaped configuration.

5. The film conveying device according to claim 1, further comprising a detector for detecting that the film is fed out of the cartridge, wherein said controller controls said driving roller so as to contact the fed film in response to detection of the film by said detector.

6. The film conveying device according to claim 1, wherein said cartridge has a flange that is configured such that the circumference thereof surrounds the film.

7. The film conveying device according to claim 1, wherein the film conveying device is applied to an image reproducing apparatus that converts an image recorded on the developed film to an electrical signal and reproduces the image in accordance with the electrical signal.

8. The film conveying device according to claim 7, wherein said image reproducing apparatus has a photosensor for sensing an image located at a predetermined sensing area and the film conveying device conveys the film to dispose a desired image at the predetermined sensing area.

9. A film conveying device which conveying a developed film accommodated in a cartridge comprising:
   a feeder for feeding the developed film out of the cartridge; and
   a curving member located near an outlet of the cartridge for imparting a curve across the width of the film fed out by said feeder.

10. The film conveying device according to claim 9, wherein said curving member includes at least one roller having a barrel-shaped configuration or a bobbin-shaped configuration.

11. The film conveying device according to claim 10, wherein said curving member includes two rollers one of which is capable of coming into contact with or being retracted from the other.

12. The film conveying device according to claim 11, further comprising a detector for detecting that the film is fed out of the cartridge, and a controller for controlling said one roller so as to contact the other roller in response to detection of the film by said detector.

13. The film conveying device according to claim 9, wherein said cartridge has a flange that is configured such that the circumference thereof surrounds the film.

14. The film conveying device according to claim 9, wherein the film conveying device is applied to an image reproducing apparatus that converts an image recorded on the developed film to an electrical signal and reproduces the image in accordance with the electrical signal.

15. The film conveying device according to claim 14, wherein said image reproducing apparatus has a photosensor for sensing an image located at a predetermined sensing area and the film conveying device conveys the film to dispose a derived image at the predetermined sensing area.

16. A film conveying device which conveys a developed film accommodated in a cartridge comprising:
   a feeder for drawing a leading edge of the developed film out of the cartridge and feeding the developed film; and
   a curving member located near an outlet of the cartridge for imparting a curve across the width of the film fed out by said feeder.

17. A film conveying device for use in a film image pickup device comprising:
   a cartridge containing a spool for holding rolled developed film thereon, the spool supporting two opposed flexible flanges that flex when the developed film is unrolled from the spool;

a feeder for drawing a leading edge of the developed film out of the cartridge and for feeding the developed film;

a driving roller, which is capable of coming into contact with or being retracted from the film fed out by said feeder, for conveying the film fed out by said feeder; and a controller for controlling said driving roller so as to selectively contact the fed film or be retracted from the fed film.

18. The film conveying device of claim 17, wherein a distance between the flanges is less than a width of the film.

19. A film conveying device for use in a film image pickup device comprising:

a cartridge containing a spool for holding rolled developed film thereon, the spool supporting two opposed flexible flanges that flex when the developed film is unrolled from the spool;

a feeder for drawing a leading edge of the developed film out of the cartridge and feeding the developed film; and a curving member located near an outlet of the cartridge for imparting a curve across the width of the film fed out by said feeder.

20. The film conveying device of claim 19, wherein a distance between the flanges is less than a width of the film.

21. The film conveying device according to claim 9, wherein the cartridge includes two opposing flexible flanges that are spaced from each other a distance that is less than a width of the film.

* * * * *